Aug. 4, 1964  J. R. V. DOLPHIN ETAL  3,143,081
GUIDANCE OF INDUSTRIAL TRUCKS
Filed Nov. 7, 1962  3 Sheets-Sheet 1
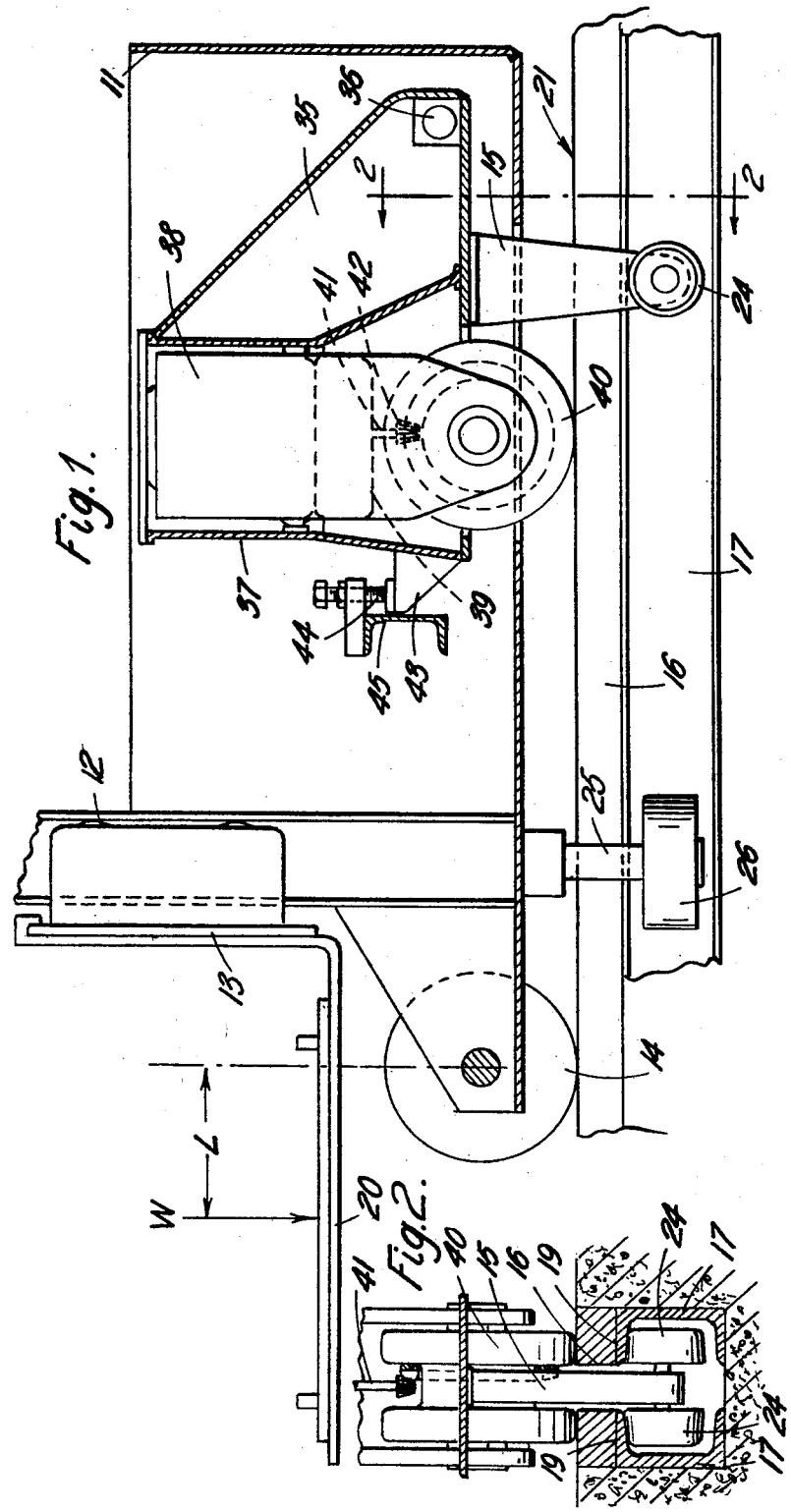

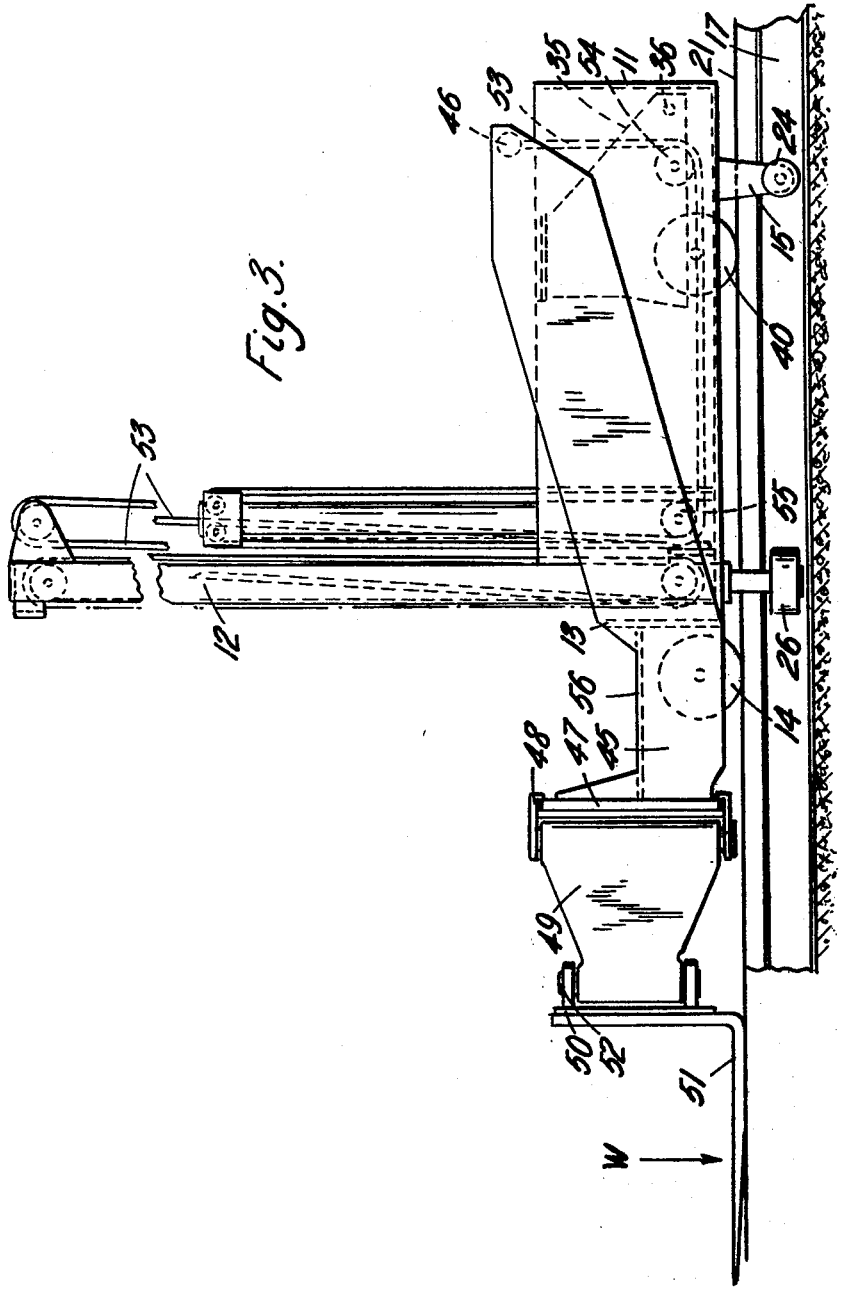

United States Patent Office 3,143,081
Patented Aug. 4, 1964

3,143,081
GUIDANCE OF INDUSTRIAL TRUCKS
John Robert Vernon Dolphin and Leonard Bruce Russell, Basingstoke, England, assignors to Lansing Bagnall Limited, Basingstoke, Hampshire, England, a British company
Filed Nov. 7, 1962, Ser. No. 236,093
Claims priority, application Great Britain Feb. 7, 1962
7 Claims. (Cl. 104—246)

This invention comprises improvements in or relating to the guidance of industrial trucks.

It is an object of this invention to provide improved means for guiding an industrial truck into and along a narrow aisle in a store. The use of rails is known for this purpose but rail tracks, if they stand up from the floor, obstruct the floor surface, and if they are let into the floor are more expensive and they demand flanged metallic wheels which transmit shocks to the load, because industrial trucks are usually unsprung.

It is a further object of the invention to provide means whereby overhang of the load at one end of a truck shall be prevented from causing the truck to tip over toward that end. Moreover, an overhung load takes load off the wheels at the other end of the truck and even if it does not cause the truck to tip over it may prevent ground wheels at the other end from having sufficient adhesion to effect propulsion. It is a further object of this invention therefore to ensure that an overhung load shall not detract from the tractive force available for propulsion when, as is usual, propulsion is effected through ground wheels or a ground wheel located at the other end from the load.

One feature of the invention comprises, in an industrial truck, the combination of a body, ground wheels at one end of the body, a load-supporting member on the body which overhangs the ground wheels so as to support a load beyond the wheel-base of the truck a cradle pivoted on the other end of the body and carrying a guide-engaging member shaped so as to be capable of engaging beneath a fixed guide rail extending parallel to the course along which the truck is to run, and a rear ground wheel operatively rotatably mounted on the cradle so that if the truck tends to tip forward under the overhanging load the guide-engaging member will apply additional downward pressure to the rear ground wheel.

In a preferred construction the guide-engaging member is a "plough" depending from the truck body and shaped to be capable of entering a slot in the floor on which the truck is to run, and carrying a roller or rollers adapted to engage the underside of a guide rail in the slot. There may be guide rollers on both sides of the plough so as to engage two guide rails in the slot, one on each side thereof.

By a "plough" is meant a narrow dependent arm such as was at one time in use for supplying electrical current to a street car through a slot in the roadway from a conduit located below the slot. In the present instance the plough may or may not be used for supplying electrical current to the truck. Its prime purpose is guidance but its engagement with the guide rail also enables it to prevent tipping of the truck under overhung loads.

As well as the "plough," additional guiding means may be provided in the slot toward the other end of the body from the plough, in position to engage the guide rails and assist in guiding the truck; this is particularly necessary on curved tracks, but it also tends to prevent deviations of the course of the truck on straight tracks.

Thus, at the front end of the truck (i.e. the end remote from the plough) there may be a depending element to enter a slot in the floor and a roller on a vertical axis (or a plurality of such rollers) on said depending element, which roller is capable of fitting between guide rails in the slot.

The rear ground wheel may be provided with means for driving it to propel the truck and owing to its connection with the plough it will have more pressure upon it the greater the overhung load and will therefore be prevented from any tendency to slip.

The following is a description, by way of example, of certain constructions in accordance with the invention, reference being made to the accompanying drawings, in which:

FIGURE 1 is a side elevation of a truck, the floor below it being shown in section;

FIGURE 2 is a section upon the line 2—2 of FIGURE 1, looking in the direction of the arrows;

FIGURE 3 is a view similar to FIGURE 1 of an alternative construction;

Figure 4:
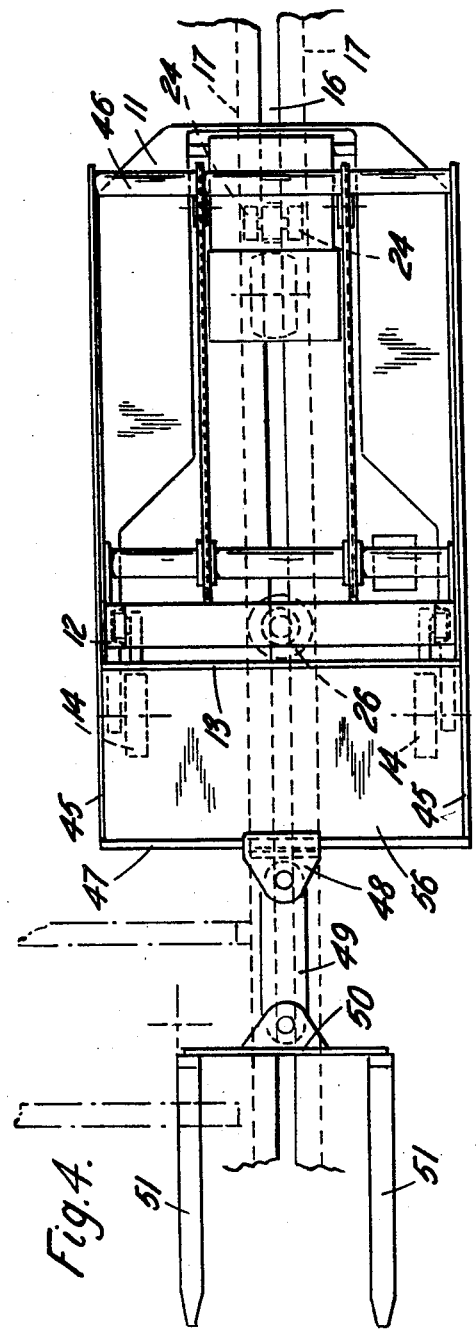
FIGURE 4 is a plan of the apparatus of FIGURE 3.

Referring to FIGURES 1 and 2, these show a truck with a body 11, rubber-tyred front wheels 14 and a mast 12. The truck is intended to run along a floor 21. On the mast is a lifting carriage 13 having a lifting platform 20 carrying a turntable with cross guides and means to support a load indicated diagrammatically by arrow W. The details of the load-supporting means are immaterial for the present invention. In the floor 21 is a slot 16 through which a plough 15 depends from the truck body and carries wheels 24 which run in channel members 17 below the slot 16. At the front end of the truck is a depending member 25 which carries a guide roller 26 running between the channel members 17. By this means the front end of the truck also receives guidance in order to carry it around curves and also to prevent deviation of the front end of the truck from the true course even along straight portions of the track. The size of the roller 26 is such that it substantially fills the space between the channel members 17, without however being tight enough to bind between them. It will be observed that the space between the channel members 17 forms a conduit beneath the slot 16.

In the present instance th plough 15 is not secured directly to the truck body 11 but to a cradle 35 pivoted to the body 11 about a pivot shaft 36 which is offset rearwardly from the plough. The cradle 35 is built-up from sheet metal and comprises a box-like portion 37 in front of the plough 15, i.e. offset from the pivot 36 on the same side thereof as the plough is offset. In the box 37 is a drive unit 38 containing an electric motor and gear-box 39 geared to a rubber-tyred ground wheel 40, by a vertical shaft 41 carrying a bevel gear 42.

On the front of the cradle 35 is a bracket 43 located beneath an adjustable set-screw 44 carried on a crossmember 45 within the body 11 of the truck. If the set-screw is screwed down it tends to lift the truck body relative to ground wheel 40 and this lifting movement will raise the rear end of the body and the pivot 36, about the axle of the front wheels 14 until the wheels 24 bear on the upper flanges 19 of the channel members 17. Further screwing down of the set-screw 44 will add load to the wheel 40 if desired.

The weight W of the load acts on a leverage represented by the arrow L to tip the truck over forwardly and this would normally take load off the ground wheel 40 and might make it slip. In the present construction however the tipping is resisted by the wheels 24 on the plough which pull the cradle 35 downward and thus add load to wheel 40. If the screw 44 is adjusted to take up the slack between wheels 24 and the tops of the channels, there is no lost motion when a tipping load comes on and the truck is remarkably stable in all manoeuvres.

It may, in many cases, be desirable to drive the truck, not in the usual way by a battery carried on the truck and battery-operated electric motor coupled to the wheels, but by electric power supplied from an external source. To this end insulated conductor rails may be mounted in the conduit below the channel members 17 and the plough 15 may carry conductor shoes which bear on the conductor rails and receive electric current from them, which is carried through the plough and used to drive a main motor acting on wheel 40, thus serving a dual purpose.

Referring now to FIGURES 3 and 4, these show a truck which is in principle similar to that described in relation to FIGURES 1 and 2. It comprises a body 11 with front wheels 14 to run on a floor 21 in which is a slot 16 containing channel members 17. There is a cradle 35 pivoted to the body at 36 from which depends a plough 15 carrying wheels 24 to run in the channel members 17 and on the cradle is also a rubber-tyred ground wheel 40, all these parts being similar to what has been described in connection with FIGURES 1 and 2.

The difference lies in the construction of the carriage 13 and associated parts. The carriage runs up and down the mast 12 as in the case of FIGURES 1 and 2 but it has side members 45 which extend forwardly in front of the ground wheels 14 and support an operator platform 56 on the carriage in front of the mast. The side members 45 also extend rearwardly to a point near the back of the body 11 above which the two sides 45 are united by a cross-bar 46. In front of the operator platform 56 there is an upright plate 47 which is formed to act as a cross-guide and to support the transversely sliding carriage 48 on which is pivoted a swinging arm 49. To the outer end of the swinging arm there is pivoted a back plate 50 carrying fork arms 51. The fork arms can be swung around the pivot 52 by which they are connected to the swinging arm 49 into the position shown in chain lines in FIGURE 4 where they project toward one side of the truck and in this position they can be traversed laterally by movement of the carriage 48 to enter beneath goods and to deposit them on a shelf in an aisle or remove them therefrom. By swinging the plate 50 toward the other side of the truck goods on the other side of the aisle can be similarly dealt with and if the swinging arm 49 is swung back parallel with the plate guide 47 while the fork arms are pointing forwardly and the carriage 48 is suitably adjusted towards one side of the truck the fork arms 51 can be brought nearer to the mast 12 while still facing forwardly. The point of this construction in connection with the present invention is that it will be seen that due primarily to the provision of the front operator platform 56 the load on the fork arms may overhang in front of the wheels 14 to a very considerable extent. The carriage is counterbalanced about the mast by means of a cable 53 connected to the cross-bar 46 and running from there beneath pulleys 54, 55 and thence over a pulley at the top of the mast 12 and down to the carriage, as more fully described in our co-pending patent application Serial No. 203,027, filed June 18, 1962. The described run of the cable 53 ensures that as the carriage rises and falls up and down, the cable 53 is paid out and taken in to the same extent and the overhung weight on the forks 51 is balanced by the pull of the cable. This does not however balance the truck itself on the floor and the tipping movement created by the weight on arms 51 is counterbalanced by the wheels 24 working in the channel members below the slot 16 while the tractive effort on the propelling wheel 40 is maintained notwithstanding the extreme tipping load.

We claim:

1. In an industrial truck the combination of a body, ground wheels at one end of the body, a load-supporting member on the body which overhangs the ground wheels so as to support a load beyond the wheel-base of the truck, a cradle pivoted on the body between the other end thereof and said ground wheels to swing up and down on the body, a guide-engaging member located upon the cradle in a position spaced from the pivotal axis thereof and shaped so as to be capable of engaging beneath a fixed guide-rail extending parallel to the course along which the truck is to run, and a rear ground wheel for the truck which wheel is rotatably mounted on the cradle at a point lying on the same side of the pivotal axis of the cradle as said guide-engaging member.

2. A truck in accordance with claim 1 wherein means is provided for limiting upward swinging movement of the cradle.

3. An industrial truck having the combination of parts claimed in claim 1, wherein the guide-engaging member is a "plough" depending from the truck body, shaped to be capable of entering a slot in the floor on which the truck is to run, and carrying a roller adapted to engage the underside of a guide rail in the slot.

4. An industrial truck as claimed in claim 3, having a roller on each side of the plough so as to engage two guide rails in the slot, one on each side thereof.

5. An industrial truck as claimed in claim 1, wherein at said one end of the truck there is a depending element to enter a slot in the floor and a roller on a vertical axis on said depending element, which roller is capable of fitting between guide rails in the slot.

6. An industrial truck having the combination of parts claimed in claim 1, wherein the rear ground wheel is provided with means for driving it to propel the truck.

7. An industrial truck as claimed in claim 1, wherein the cradle is pivoted to the truck behind the rear ground wheel and the guide-engaging member engages the guide rail at a point between the pivot and the ground wheel.

References Cited in the file of this patent

UNITED STATES PATENTS

| | | |
|---|---|---|
| 468,860 | Wright | Feb. 16, 1892 |
| 845,405 | Gerard | Feb. 26, 1907 |
| 867,765 | Strickler | Oct. 8, 1907 |
| 1,613,866 | Avery | Jan. 11, 1927 |
| 1,981,655 | Lucke | Nov. 20, 1934 |
| 2,608,163 | Martin | Aug. 26, 1952 |
| 2,621,610 | Boydo et al. | Dec. 16, 1952 |
| 2,950,831 | Anzons | Aug. 30, 1960 |

FOREIGN PATENTS

| | | |
|---|---|---|
| 566,049 | Great Britain | Dec. 11, 1944 |